UNITED STATES PATENT OFFICE.

HARRY H. PIERCE, OF TOLEDO, OHIO, ASSIGNOR OF ONE-HALF TO ALLEN C. BRANTINGHAM, OF SAME PLACE.

CEMENT.

SPECIFICATION forming part of Letters Patent No. 622,387, dated April 4, 1899.

Application filed April 9, 1898. Serial No. 676,999. (No specimens.)

*To all whom it may concern:*

Be it known that I, HARRY H. PIERCE, a citizen of the United States, residing at Toledo, Lucas county, Ohio, have invented certain new and useful Improvements in Cement, of which the following is a specification.

My invention relates to and its object is to provide a cement designed for use as a substitute for lime, mortar, or plaster for building purposes, and is designed to furnish an article that will be cheap, which may be stored and transported without change, which will always be ready for use, and which when applied will quickly grow strong, tenacious, and hard, and which will not crack, chip, swell, or alter in walls when in place.

In carrying out my invention I take finely-pulverized sulfate of lime or raw gypsum and thoroughly mix it with common quicklime which has been slaked to a putty. If necessary, the putty may be screened to remove bits of unslaked lime or coarse substances. The mixture thus obtained is now roasted in an oven or rotary drier at about 400° Fahrenheit for a sufficient length of time to drive off the adhering uncombined moisture, together with the water of crystallization, and to diffuse through the mass such gaseous constituents of the lime and the gypsum as are released in the roasting. The length of time the material should be subjected to the heat will depend upon the amount of water present in the putty. The degree of heat may vary; but in no case should the material be brought to a red heat or such heat as will vitrify the mass. The material after roasting is hard and apparently homogeneous. It is now crushed or ground to a fine powder and may, if desired, be bolted. The powder thus obtained may now be mixed with water to form a putty or mortar of proper consistence and may be used as lime plasters and mortars are used. The material after it is wet will set and dry more rapidly than common lime plasters or mortars, but not so rapidly as Portland cement. The rapidity with which the material will set is found to depend largely upon the proportion of gypsum employed; but I find that an admixture of from fifteen to twenty-five per cent. of gypsum, by weight, produces good results.

Having described my invention, what I claim, and desire to secure by Letters Patent, is—

1. The process which consists, first, in slaking quicklime to a putty; second, adding thereto pulverized sulfate of lime; third, roasting this mixture to drive off the moisture, and to diffuse the gases thereby released, and, fourth, reducing to a powder the roasted product thus obtained, substantially as and for the purpose specified.

2. As an article of manufacture, lime which as quicklime has been slaked to a putty, then mixed with pulverized sulfate of lime, then roasted to drive off the moisture and to diffuse the gases thereby released, and then reduced to a powder, substantially as and for the purpose specified.

HARRY H. PIERCE.

In presence of—
ALMON HALL,
L. E. BROWN.